May 2, 1950 J. R. CAULFIELD 2,506,011
ENCLOSED FOUNTAIN GRAVURE PRESS
Filed Oct. 23, 1946 10 Sheets-Sheet 1

FIG. 1

INVENTOR
JOSEPH R. CAULFIELD
BY James and Franklin
ATTORNEY

FIG. 2

May 2, 1950          J. R. CAULFIELD          2,506,011
ENCLOSED FOUNTAIN GRAVURE PRESS Filed Oct. 23, 1946          10 Sheets-Sheet 3

INVENTOR
JOSEPH R. CAULFIELD
BY James and Franklin
ATTORNEY

May 2, 1950 J. R. CAULFIELD 2,506,011
ENCLOSED FOUNTAIN GRAVURE PRESS
Filed Oct. 23, 1946 10 Sheets-Sheet 5

INVENTOR
JOSEPH R. CAULFIELD
BY
ATTORNEY

May 2, 1950 J. R. CAULFIELD 2,506,011
ENCLOSED FOUNTAIN GRAVURE PRESS
Filed Oct. 23, 1946 10 Sheets-Sheet 7

INVENTOR
JOSEPH R. CAULFIELD
BY
ATTORNEY

May 2, 1950 J. R. CAULFIELD 2,506,011
ENCLOSED FOUNTAIN GRAVURE PRESS
Filed Oct. 23, 1946 10 Sheets-Sheet 9

INVENTOR
JOSEPH R. CAULFIELD
BY
ATTORNEY

May 2, 1950        J. R. CAULFIELD        2,506,011

ENCLOSED FOUNTAIN GRAVURE PRESS

Filed Oct. 23, 1946        10 Sheets-Sheet 10

INVENTOR
JOSEPH R. CAULFIELD
BY *James and Franklin*
ATTORNEY

Patented May 2, 1950

2,506,011

UNITED STATES PATENT OFFICE 2,506,011

ENCLOSED FOUNTAIN GRAVURE PRESS

Joseph R. Caulfield, West Norwood, N. J., assignor to Champlain Company, Inc., Bloomfield, N. J., a corporation of New York Application October 23, 1946, Serial No. 705,030

5 Claims. (Cl. 101—153)

This invention relates to printing presses, and more particularly to gravure presses of the enclosed fountain type.

The primary object of the present invention is to generally improve gravure printing presses, especially the enclosed fountain type.

Heretofore when the color of the ink used had to be changed in an enclosed fountain gravure press, hours of time would be lost in scrubbing the ink fountain in an effort to remove every trace of the old color. This was particularly difficult because of the ink working into the pores of the cast metal. In accordance with a further feature and object of the present invention, the fountain is provided with a readily removable and changeable ink pan or liner. A different ink pan or liner may be used for each color, the ink pan being readily changed during the operation of changing the gravure cylinder. The pan may be made of stainless sheet steel or other metal with a hard, shiny surface which is easily cleaned, when desired, in lieu of using a different pan for every color.

Still another object of the present invention is to facilitate the operation of changing the gravure cylinder and ink pan, and for this purpose the entire enclosed fountain is made axially movable to a position outside the press. Appropriate tracks and rollers are provided for this purpose, both inside and outside the machine, the outside tracks being removable when not in use.

To accomplish the foregoing general objects, and other more specific objects which will hereinafter appear, my invention resides in the enclosed fountain gravure press elements, and their relation one to the other, as are hereinafter more particularly described in the following specification. The specification is accompanied by drawings, in which:

Figure 1:
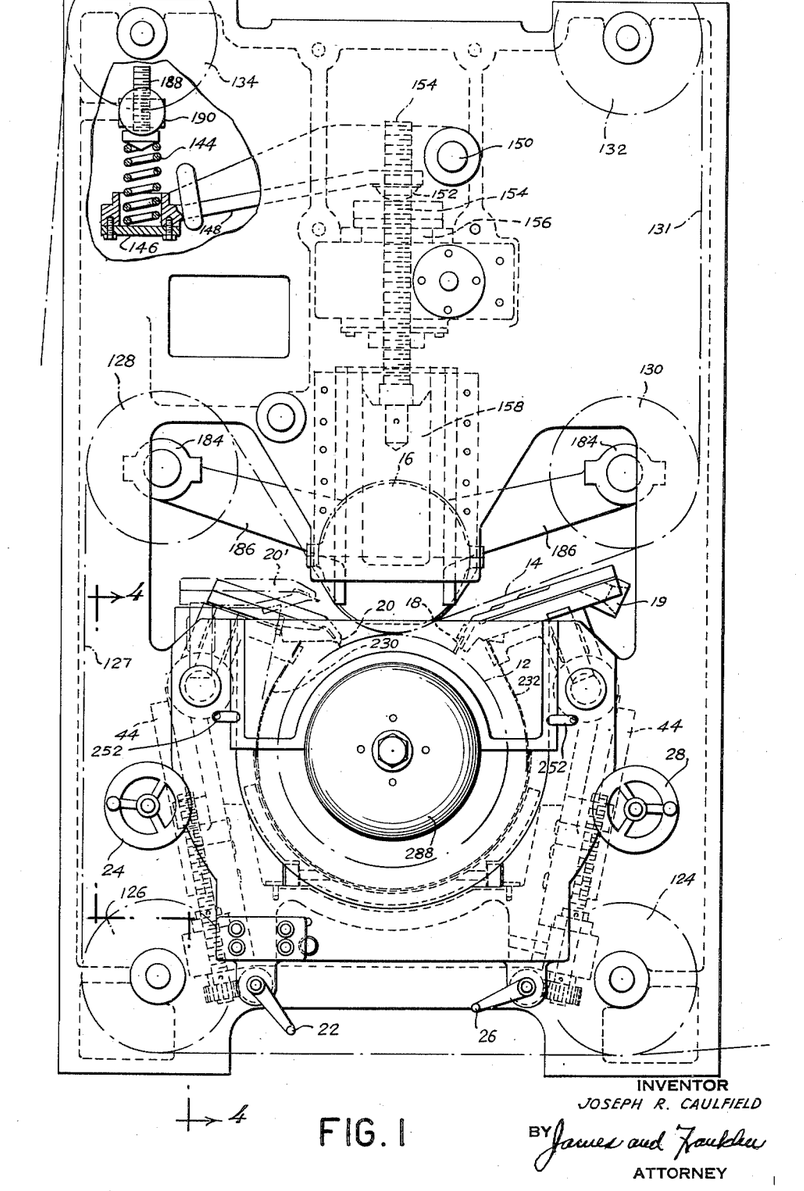
Fig. 1 is a side elevation of a gravure press unit embodying features of my invention.

Referring to the drawings, and more particularly to Fig. 1, the printing unit there shown comprises a gravure cylinder 12 against which a web 14 is held by a pressure roller 16. Ink is applied to the cylinder 12 by means of an ink applicator or nozzle 18, and is wiped from the cylinder by means of a doctor blade 20, the cylinder turning clockwise, and the web being fed from left to right, as viewed in the drawing. The press includes means for adjusting the position of the doctor blade holder so as to provide a substantially desired wiping angle at a substantially desired location on the periphery of the gravure cylinder 12 despite changes in diameter of the gravure cylinder. As here illustrated, there are control handles 22 and 24 which are readily accessible outside the press. Similar adjusting means, including control handles 26 and 28, are provided symmetrically on the opposite side of the machine for carrying the nozzle 18, and the parts are made interchangeable so that nozzle 18 may be replaced with doctor blade 20 and vice versa, in which case the direction of rotation of the cylinder may be reversed for back printing.

Considering the adjusting mechanism in greater detail, in the present construction the handle 22 raises or lowers the doctor blade, while the handle 24 tilts the doctor blade. The mechanism for this purpose is shown in greater detail in Figs. 2 and 4, and referring to those figures, it will be seen that handle 22 (Fig. 4) turns a shaft 30 carrying worms 32 meshing with worm gears 34 on screws 36. The smooth lower journal portions 38 of these screws are rotatably carried in bearings 40, and are held against axial movement by appropriate collars. The upper portions 36 of the screws are threadedly received in bosses 41, which project from a plate 42 which is arranged to slide in a generally upright direction in guide ways or gibs, indicated at 44 in Fig. 1, but omitted in Figs. 2 and 4. The screws 36 and plate 42 are for convenience referred to as generally upright, but it will be seen in Figs. 1 and 2 that they slope outwardly, this moving the doctor blade holder inwardly as it is brought downwardly for cooperation with a small-diameter cylinder, and outwardly as it is raised for cooperation with a large-diameter cylinder.

Figure 2:
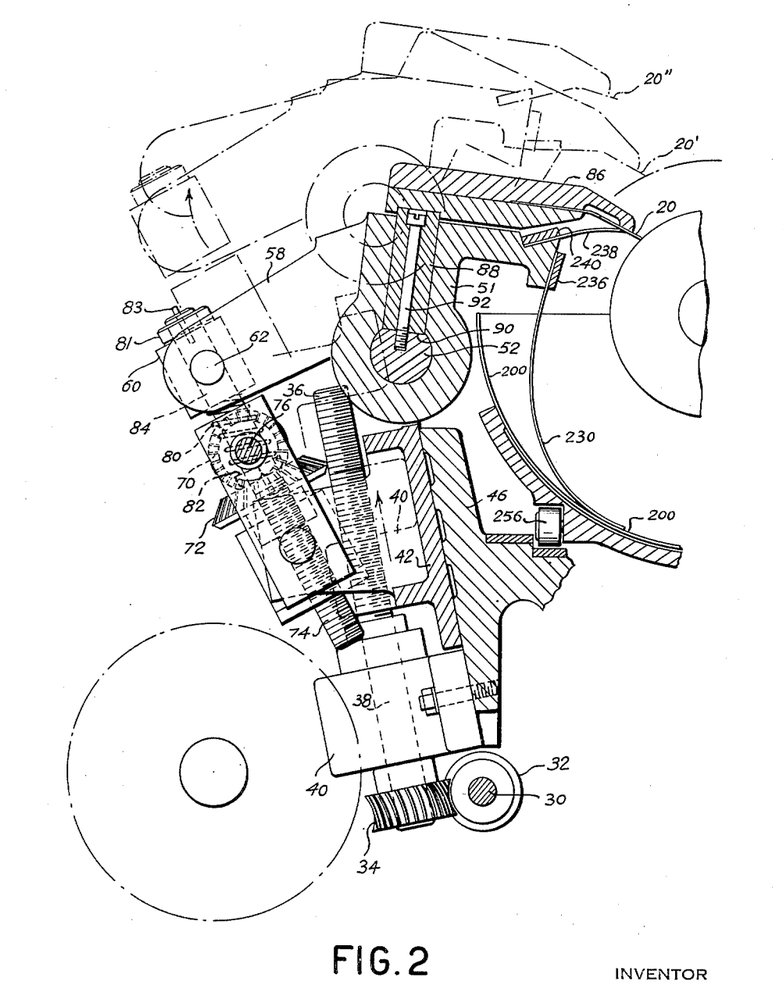
Fig. 2 is a section through the adjusting mechanism for the doctor blade holder, and is taken approximately in the plane of the line 2—2 of Fig. 4.

In Fig. 2, it will be seen that the slidable plate 42 bears against a stationary part 46 of the press, on which the stationary bearings 40 are mounted. The part 46 is a tie brace or cross-brace extending between the side frames 48 and 50 (Fig 4) of the press, and acts also to provide tracks for removal of the ink fountain, as will be described later.

Because of the use of worm gears and screws, the mechanism is irreversible, and the plate 42 will remain at whatever height it is adjusted.

A bracket 51 (Fig. 2) is tiltably mounted on plate 42 to provide adjustment of the doctor blade angle. For this purpose a shaft 52 passes through bracket 51, and is received in split bearings 54 (Fig. 4) forming a part of the plate 42. The bracket is cut away or recessed to fit around the bearings 54 but the end portions 56 overlie the bearings. The bracket 51 has a pair of arms 58 projecting outwardly therefrom, and a bar 60 is pivotally mounted between the arms 58 by means of suitable pivots 62. The tilting movement for bracket 51 is applied through the bar 60.

For this purpose the handle 24 (Fig. 4) turns a shaft 63 connected by universal joints or flexible couplings 64 and 66 to a spindle 68 carrying a bevel gear 70. Gear 70 meshes with a bevel gear 72 which threadedly receives a screw 74. This in turn moves the bar 60, and through it tilts the bracket 51. The connecting shaft between the universal joints 64 and 66 is telescopic, it comprising relatively slidable parts 76 and 78. The bearings 80 and 82 for the bevel gears are carried by the slidable plate 42 which is raised or lowered by handle 22, and it will be understood that the illustrated flexible or any equivalent shaft arrangement is provided between the handle 24 and the gear 70 merely to accommodate the up and down adjustment of the plate 42.

Figures 3, 4:
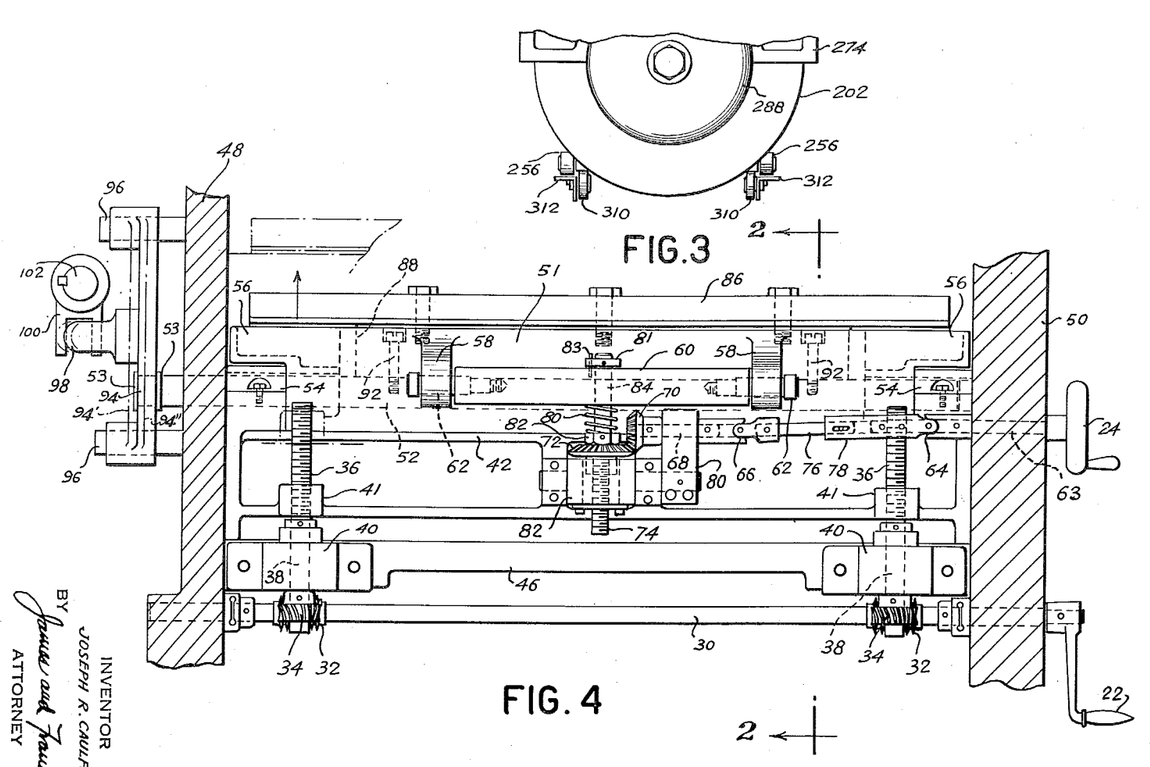
Fig. 3 is a detail explanatory of a modification of another feature of the invention.
Fig. 4 is a transverse section showing the adjusting mechanism for the doctor blade, and is taken approximately in the plane of the line 4—4 of Fig. 1.

The wiping action of the resilient doctor blade is additionally cushioned by means of a compression spring 80'. This bears at its lower end against a nut 82', and at its upper end against the bar 60. The smooth upper portion 84 of screw 74 is slidable through bar 60. It is held against rotation by a collar 81, to which it is pinned, and which in turn is slidable on but nonrotatable because of a pin 83. The tension of spring 80' may be controlled by adjusting the nut 82', and when once adjusted may be left constant, the nut being provided with a set screw or equivalent locking means. Rotation of handle 24 turns the internally threaded gear 72, and so raises or lowers the screw 74, thereby tilting the bracket 51.

The spring cushioning action on the doctor blade is in the one direction only. In the reverse direction, the collar 81 on the screw positively pulls the doctor holder away from the cylinder.

The doctor blade 20 is carried by a doctor blade holder 86 (Fig. 2), which in turn is carried by the tiltable bracket 51 previously referred to. However, it is not fastened directly to the bracket, for it is desired to reciprocate the doctor blade longitudinally relative to the gravure cylinder. For this purpose the holder 86 is bolted to a long flat key 88, which in turn is secured to a flattened top surface 90 on shaft 52, as by means of screws 92. The bracket 51 is shaped to receive the key 88, and both the shaft 52 and the key 88 are longitudinally reciprocable for a limited distance. In practice the movement may be set at from, say, 1/4" to 1 1/4".

In Fig. 4 it will be seen that the projecting end of the shaft 52 engages a cross-head 94 slidably carried by stationary guides 96. The cross-head 94 has a finger 98 received in a yoke 100 oscillatable with a shaft 102 extending longitudinally of the line of press units. Oscillation of shaft 102 reciprocates the cross-head 94 between the positions indicated at 94' and 94''. This in turn reciprocates the shaft 52, and with it the key 88, the doctor blade holder 86, and the doctor blade 20. The specific mechanism for oscillating the shaft 102 may be conventional, forms no part of the present invention, and need not be described in detail.

Cross-head 94 is employed to permit up and down adjustment of plate 42. The cross-head is disposed parallel to the plate 42, and is longitudinally slotted to receive the end of shaft 52. The flanges 53 cause the shaft to move axially with the cross-head, without interfering with up and down movement of the shaft relative to the cross-head.

In Fig. 2, the doctor blade is shown in three positions, 20, 20' and 20''. These correspond to gravure cylinders of small, medium and large size respectively. In the intermediate position 20', the doctor blade is disposed about thirty degrees away from the top of the cylinder. In the position 20, the location of the doctor blade is slightly more than thirty degrees, and in the position 20'' the position of the doctor blade is slightly less than thirty degrees from the top of the cylinder, but all of the positions are approximately thirty degrees. Furthermore, by an appropriate combination of both up and down movement and tilting movement, the wiping angle of the doctor blade, as well as the location of the doctor blade, may be kept at a satisfactory and approximately constant angle. In some cases it may be desired to change the wiping angle, depending, for example, on the depth to which the cylinder has been etched.

In connection with Fig. 1, it was mentioned that the mechanism for adjusting the position of the doctor blade on one side of the fountain is duplicated on the opposite side under control of handles 26 and 28. This does not apply to the mechanism to vibrate the doctor blade. The arm 100 (Fig. 4), finger 98, and cross-head 94, are used on one side or the other, for the doctor blade, but not for the nozzle. By reversing the doctor blade and nozzle, and changing the gears driving the cylinder to reverse its rotation, the press may be used for back printing.

Figure 5:
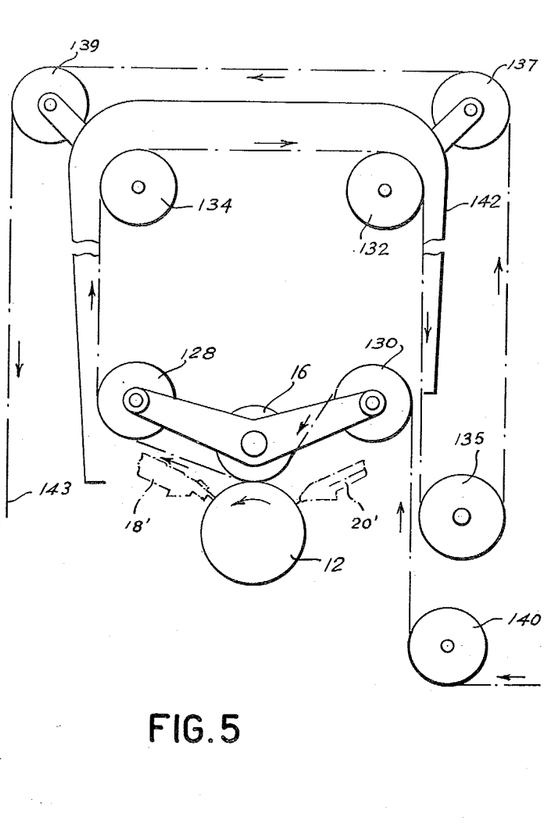
Figs. 5 and 6 contrast the movement of the web for back and face printing.
Figure 6:
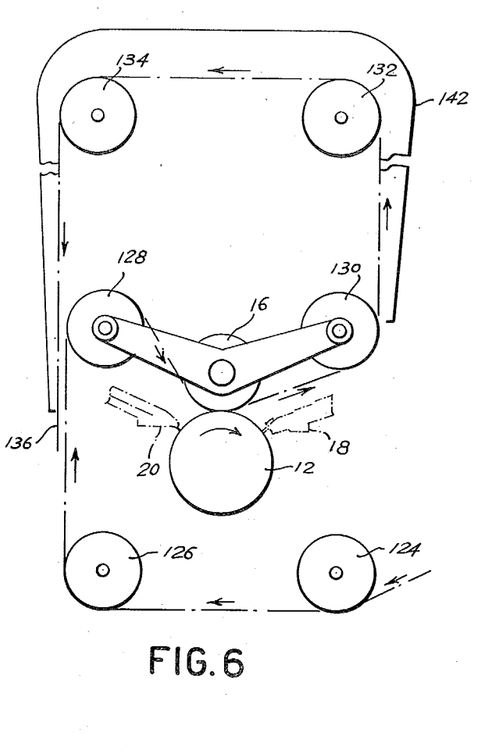
Figures 9, 10:
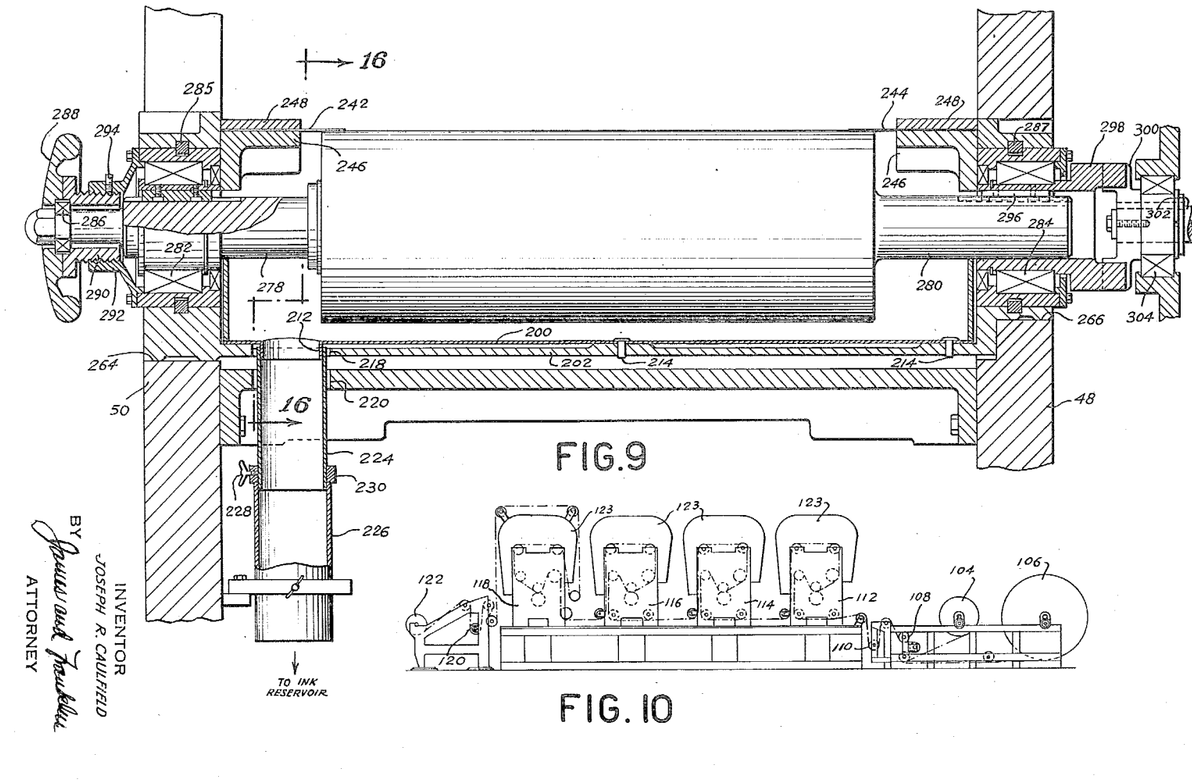
Fig. 9 is a vertical section taken longitudinally of the gravure cylinder through the ink fountain.
Fig. 10 is a side view showing multi-color printing units arranged in series with one press modified for back printing.

This is shown in greater detail in Figs. 5, 6 and 10. In Fig. 10, the web is taken alternatively from either the roll 104 or 106, and after being fed through a feed unit 108, which pulls the web from the roll, passes under a dancer roller 110 which measures the slack loop of web, and controls the feed unit, and which also tensions the web. It is then fed in forward direction through press units 112, 114, 116, and in reverse direction through press unit 118, and thence under a dancer roller 120 to other apparatus, or to a rewind roll 122. Drier hoods are indicated at 123. It will be understood that any desired number of units, say, up to ten units or more, may be mounted on a single foundation for multicolor front and back printing. Referring now to Fig. 6, the web when fed in normal forward direction, runs under guide rollers 124 and 126, thence vertically upward to guide roller 128, thence downward between gravure cylinder 12 and pressure roller 16. The web then runs around guide roller 130, vertically upward to guide roller 132, and to roller 134, and thence downward as indicated at 136. In this case the nozzle is at 18 and the doctor at 20.

In Fig. 5, however, the web is fed around guide roller 140, vertically upward to guide roller 130, and thence between the gravure cylinder 12 and the pressure roller 16. The web then runs around guide roller 128, vertically upward to guide roller 134, and to roller 132. The web then runs downwardly around a guide roller 135, and upwardly around rollers 137 and 139 outside the drier hood 142, and thence downwardly at 143. In this case the nozzle is at 18' and the doctor at 20'. It will be understood that the drier 142 is provided with a blower or/and heating elements to help rapidly dry the freshly printed web as it leaves the gravure cylinder.

Reverting to Fig. 1, the nozzle 18 is supplied with ink at an inlet 19, to which a suitable flexible hose may be connected. The internal structure of the nozzle may be conventional, and requires no detailed description. It includes a manifold arrangement which distributes a stream of ink across the entire width of the nozzle (and the entire length of the cylinder) at uniform pressure. Each particle of ink travels an equal distance with equal resistance to flow, because of the symmetrically arranged manifold. For back printing, the flexible hose to the nozzle is brought up to the other side of the press from a circulating pump connected to an enclosed ink reservoir or tank. The tank and pump are not shown because they may be conventional.

Figure 7:
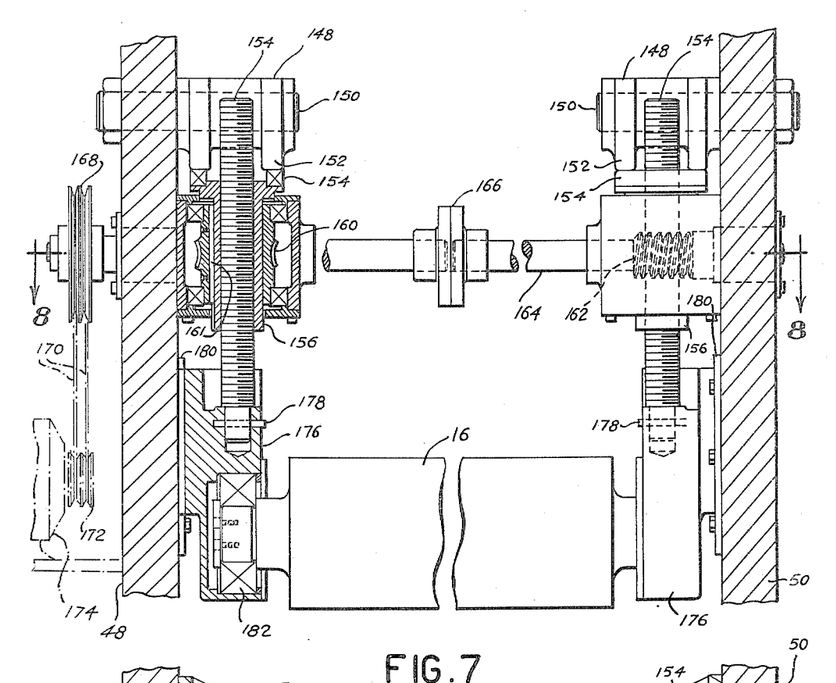
Fig. 7 is a transverse section showing the mechanism for raising or lowering the pressure roller, and is taken approximately in the plane of the line 7—7 of Fig. 8.
Figure 8:
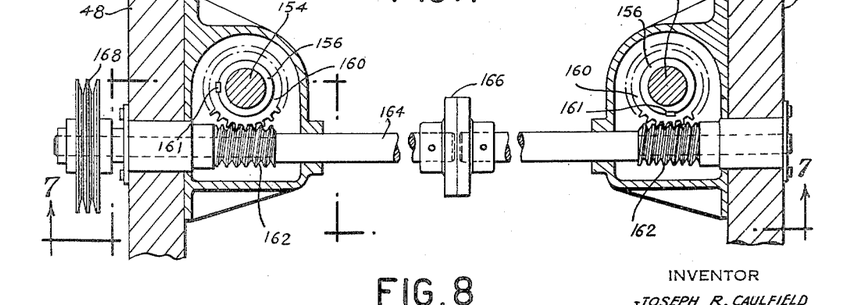
Fig. 8 is a horizontal section taken approximately in the plane of the line 8—8 of Fig. 7.

The height and pressure of the pressure roller is adjusted by mechanism best shown in Figs. 1, 7 and 8. In Fig. 1, the pressure of the roller 16 is determined by compression springs 144 (only one of which is shown). This bears downwardly on the cupped end 146 of a lever 148 fulcrumed at 150, and having curved projections 152 on opposite sides of a screw 154. The projections 152 bear against a thrust bearing 154 at the upper end of a threaded bushing 156. The lower end of screw 154 is secured to a bearing 158 which carries the journal at one end of the pressure roller 16. The bearing is vertically slidable in suitable gibs or ways. It will be understood that this mechanism is provided in duplicate for each end of the pressure cylinder.

Referring now to Figs. 7 and 8, the internally threaded bushings 156 may be rotated by means of worm gears 160 through slidable keys 161. Gears 160 mesh with worms 162 on a shaft 164. To facilitate assembly, the shaft 164 may be made in two parts joined by a coupling 166. Shaft 164 is journaled in the side frames 48 and 50 of the machine, and its outer end carries pulleys 168 belted by appropriate V-belts 170 to pulleys 172 on a motor 174.

By running the motor in one direction or the other, the worms 162 may be turned in one direction or the other, thus rotating the gears 160, and with them the internally threaded bushings 156. This raises or lowers the screws 154, the latter being non-rotatably secured to bearing slides 176, as by means of pins 178. The slides 176 move in gibs or ways 180, and at their lower ends carry bearings 182 in which the ends of the pressure roller 16 are journaled, as is best shown in Fig. 7.

The internally threaded bushings 156 are slightly movable in a vertical direction, so that the pressure of the cams or curved surfaces 152 on the thrust bearings 154 may be transmitted through the internally threaded bushings 156 to the screws 154, the slidable bearings 176, and finally to the roller 16.

It will be understood that the shaft 164 may, if desired, be provided with a crank or handwheel for manual operation, although to save time and labor I prefer to provide a motor drive, as here indicated.

In raising or lowering the pressure roller, it is a great convenience to be able to leave the web in the machine without disturbing the web length or web tension. This is done in the present case by connecting the guide rollers 128 and 130 (Fig. 1) to the pressure roller 16 in such a manner that all three rollers are bodily raised or lowered as a unit, and by so positioning the rollers 126 and 132 that the web leading to the roller 128, and the web leaving the web 130, are both vertical. It will be evident that when the combination of three rollers is raised, the vertical web portion 131 will be shortened by exactly the same amount that the vertical web portion 127 is lengthened, and consequently there is no alteration in the length or tension of the web. The journals at the ends of the guide rollers 128 and 130 are carried in bearings 184 at the ends of arms 186, which are connected rigidly to the slides 158, so that any change in height of the slide by means of the screw mechanism previously referred to, is applied to all three rollers.

Before leaving the subject of the pressure roller, it may be mentioned that the working pressure applied thereto may be by hydraulic means, instead of by mechanical springs. When compression springs are employed, as here shown, the pressure may be made adjustable, as by means of a screw 188 (Fig. 1) which is threadedly received in a stationary bracket 190, and which may be screwed downwardly or upwardly to change the length and consequently the tension of the spring 144.

Figure 16:
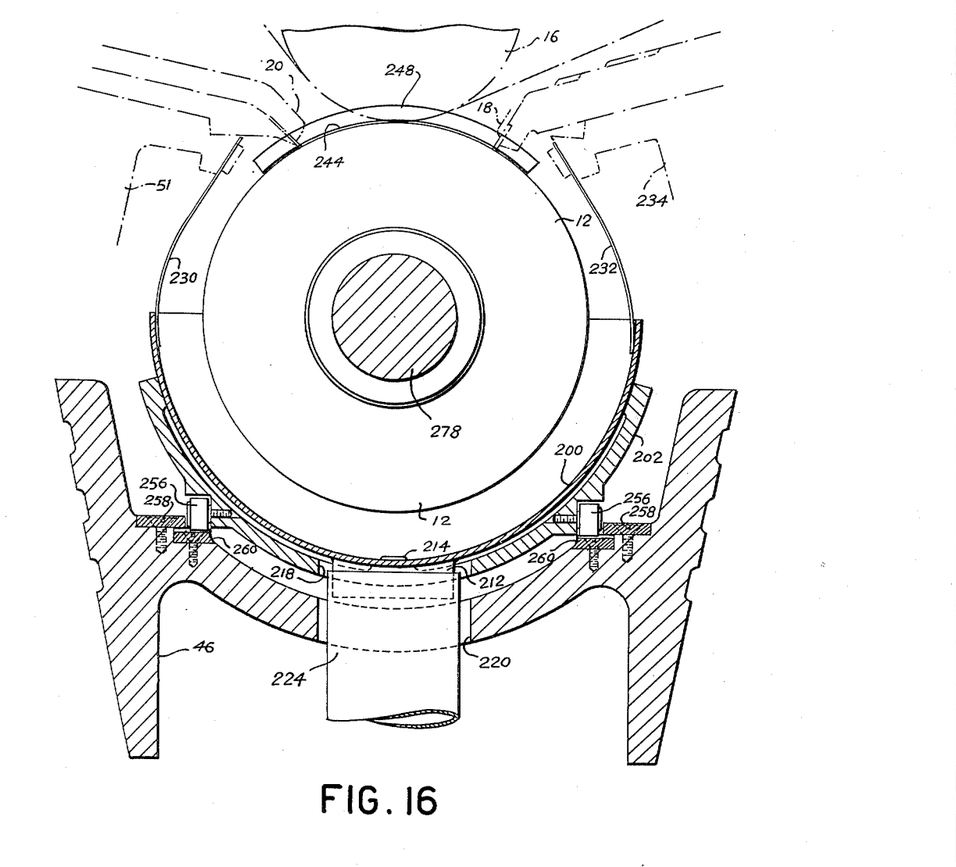
Fig. 16 is a section across the ink fountain and ink pan in relation to the frame of the printing press.
Figure 19:
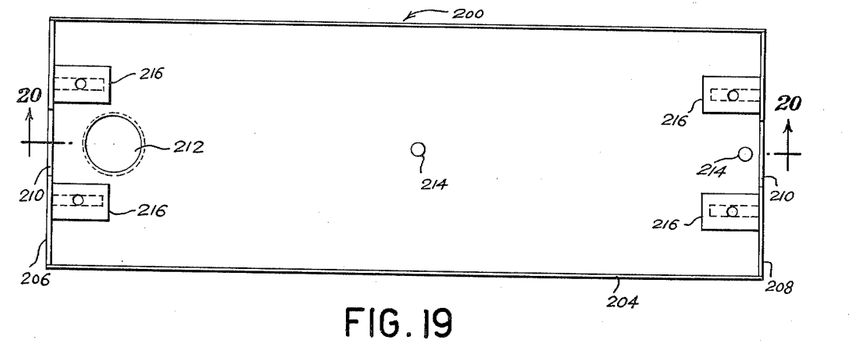
Fig. 19 is a plan view of the ink pan.
Figure 20:
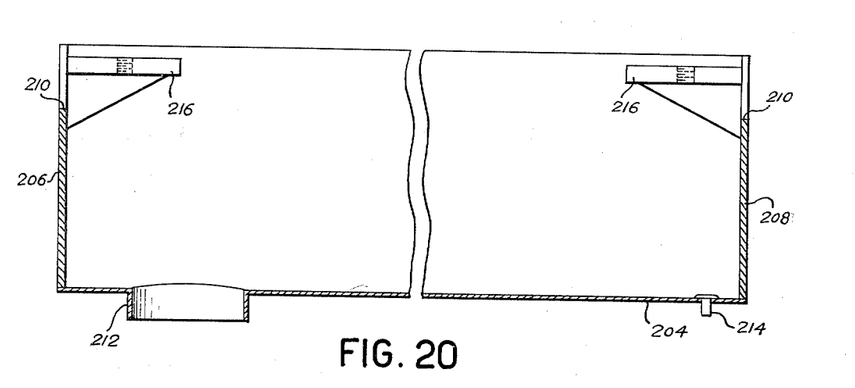
Fig. 20 is a vertical section taken approximately in the plane of the line 20—20 of Fig. 19.
Figure 21:
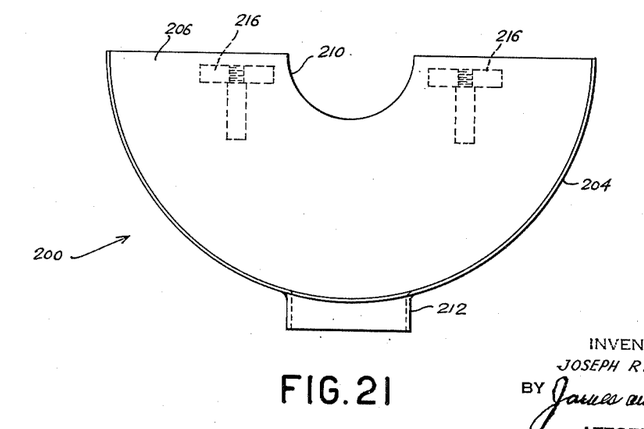
Fig. 21 is an end elevation of the ink pan.

Another feature of the invention is the provision of an ink pan or liner 200 (see Fig. 9) within the fountain 202. The relation of the ink pan 200 to the fountain 202 is also shown in Fig. 16. Figs. 19, 20 and 21 show the ink pan 200 itself, it comprising a semi-cylindrical wall 204 closed by approximately semi-circular ends 206 and 208. The ends are cut away at 210 to clear the journals of the gravure cylinder. The bottom of the pan near one end has an ink discharge opening 212. It may also be provided with locating pilots or pins 214, which help properly locate the pan against turning within the ink fountain. Finally, the pan is provided with brackets 216 for receiving end shields as described later.

Figures 13, 14, 15:
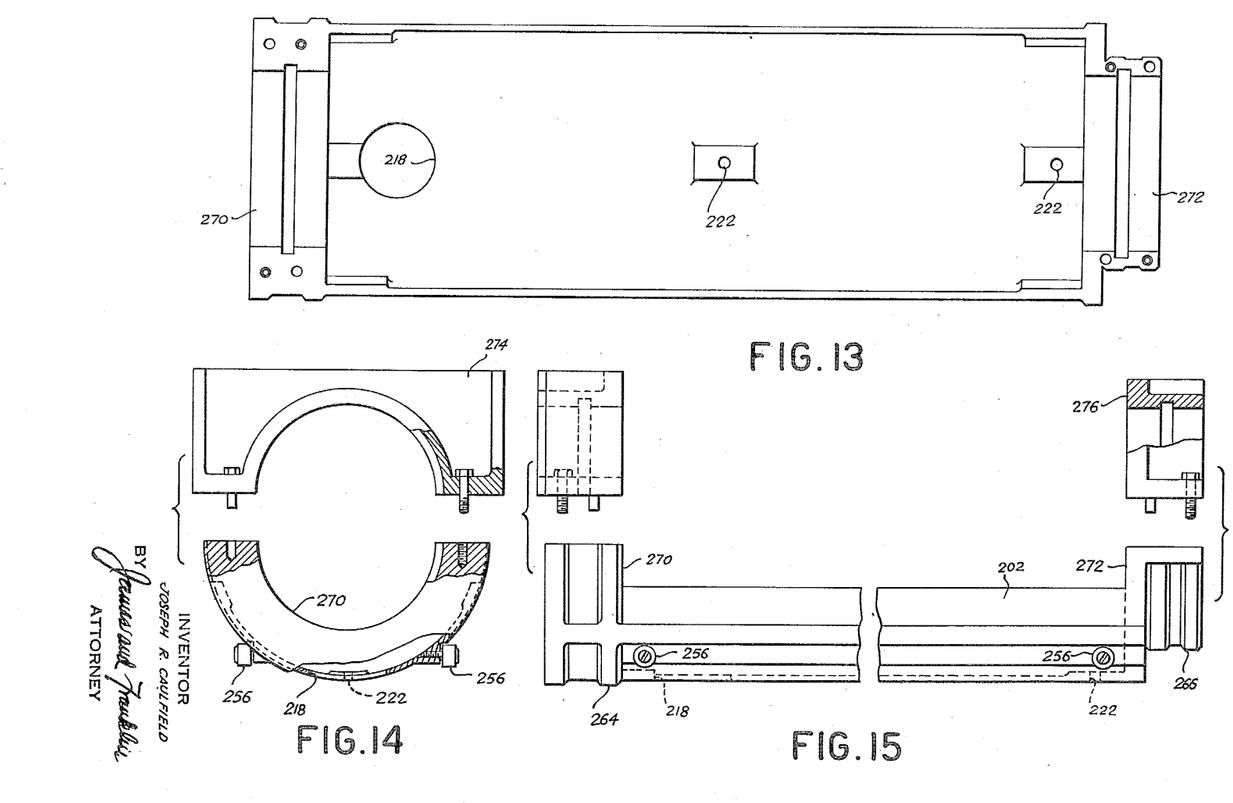
Fig. 13 is a plan view of the ink fountain, with the bearing cover removed.
Fig. 14 is a partially sectioned end view of the same, with the bearing cover separated.
Fig. 15 is a side elevation of the same.

Fig. 16 shows the manner in which the ink discharge flange 212 passes through a mating opening 218 in the ink fountain 202, and is in registration with an opening 220 in the cross-brace 46 of the machine. Figs. 9, 13, and 14 also show the opening 218 for ink discharge, and the holes 222 (Fig. 13) for the pilot pins 214 previously referred to. Fig. 9 additionally shows how the discharge ink is conveyed back to the tank or reservoir, from which it is again pumped up to the nozzle. Specifically, there is a pipe 224, the upper end of which fits around the flange 212, and the lower end of which is telescopically received in a pipe 226. Pipe 224 is held in an elevated position by a wing screw 228 threadedly received in a collar 230. Whenever the ink fountain is to be moved axially out of the machine, the wing screw 228 is released and the pipe 224 is preliminarily lowered, thus clearing the way for axial movement of the fountain.

The changeable ink pan or liner may be made of stainless steel, thus facilitating cleaning, for the stainless steel is relatively non-porous compared to the cast metal of the fountain. This makes it unnecessary to have as many pans as there are ink colors, although the latter arrangement is entirely feasible and of great advantage. It will be understood that on changing the ink color, the nozzle may be changed, as well as the pan, to avoid thorough cleaning of the nozzle.

Referring now to Fig. 16, another feature of the invention is the sealing aprons 230 and 232 secured to the doctor blade bracket 51 and the nozzle bracket 234 respectively. These aprons are made of springy metal, and are so shaped as to bear snugly against the ink pan. The aprons act as splash guards which prevent the ink from reaching the mechanism for adjusting and moving the holders. They also limit the air space around the gravure cylinder 12, and so help prevent evaporation of the ink. They are so shaped and designed as to bear against the ink pan despite changes in the position of the doctor blade and nozzle to accommodate different diameters of cylinder. Thus Fig. 16 illustrates the position of the aprons when dealing with a gravure cylinder of maximum diameter. Fig. 2 shows the relatively flexed position of the apron 230 when the doctor blade has been brought down to a small gravure cylinder. At the doctor blade positions 20' and 20'', the apron 230 will continue to bear against the inside of the ink pan or liner 200, and thus help complete the sealed enclosure of the ink. Moreover, when the doctor blade holder and nozzle holder are raised preparatory to removing the fountain, the aprons move upwardly with the holders out of the way.

Fig. 2 also show how the apron 230 may be secured directly to the bracket 51 with the help of a clamping strip 236. It is not secured to the doctor blade holder 86 for it is not intended that the apron reciprocate back and forth longitudinally of the cylinder. Instead, the apron is preferably of full length, and extends all the way from one end of the ink pan to the other.

To help finish the sealing of the fountain, a sealing blade 238 is provided, in addition to the doctor blade 20. The doctor blade 20 is necessarily shortened in axial direction to permit longitudinal reciprocation. Thus the fountain would be open at the ends of the doctor blade, and to avoid this, the sealing blade 238 is provided. This immediately underlies the doctor blade, but does not bear against the cylinder, and since it does not reciprocate, it may be made of full length. For this reason, it is secured directly to the bracket 51, rather than to the doctor blade holder 86, it being held by an appropriate clamping strip 240.

Figure 12:
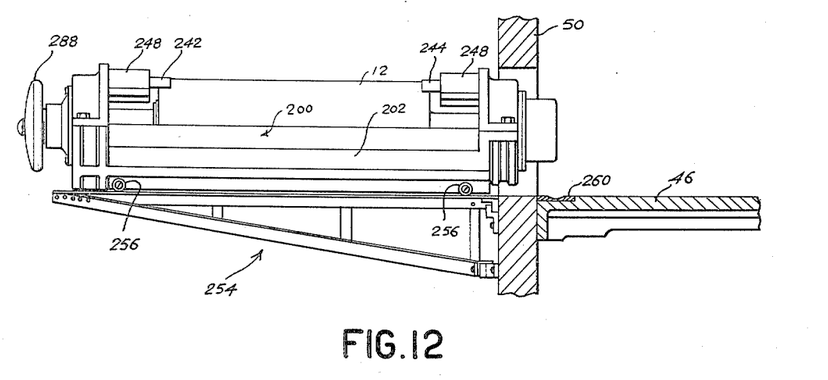
Fig. 12 is a section taken approximately in the plane of the line 12—12 of Fig. 11.

As so far described the fountain is fully enclosed except for the space at the top between the doctor blade and nozzle at the ends of the cylinder. To close this space, appropriate end shields may be provided. Referring to Figs. 9 and 12, curved strips 242 and 244 of a suitable soft metal such as zinc, lead or brass, are secured between arcuate supports 246 (Fig. 9) and clamping plates 248. The curved supports 246 and the soft metal strips 242 and 244 conform in curvature to the radius of the gravure cylinder. Different shields must be used for different diameter cylinders. The supports 246 are bolted to the brackets 216 previously referred to, and best shown in Figs. 19, 20 and 21. It will be understood that the shields 242 and 244 extend over an arc of approximately sixty degrees, or enough to just fill the space between the doctor blade on one side, and the nozzle on the other.

Figure 11:
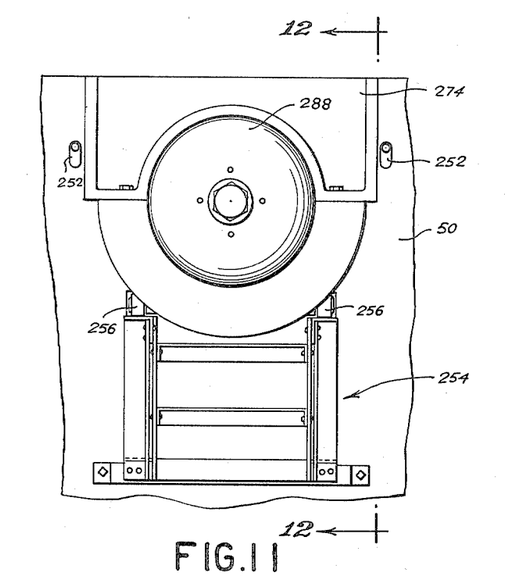
Fig. 11 is a side elevation of a part of a press showing the ink fountain pulled out of the press.

Another feature of the invention is the arrangement for axial removal of the fountain. In Figs. 1 and 11, note the clamps 252 which may be released to clear the end of the fountain. In Fig. 1, the clamps are in holding position, while in Fig. 11 they are in released position. Figs. 11 and 12 also show an outside track structure or support generally designated 254, which may be added to the side of the press preparatory to sliding the fountain and cylinder out of the press. In the particular form here shown, the support 254 is made of angle iron stock, and includes hook-like members for detachably anchoring the support on the side of the press. The two rails act as extensions of rails inside the press, and the fountain is preferably provided with rollers 256 to facilitate rolling the fountain out of the machine. The rollers 256 on the fountain are also shown in Figs. 14, 15 and 16. In Fig. 16, it will be noted that steel strips 258 are secured to the cross-brace 46 outside the wheels 256, these acting as side guides to prevent sideward movement of the fountain as it is moved axially out of the machine.

In order not to put a sustained load on the rollers 256, the tracks of the outside support for the fountain may themselves be provided with a series of rollers, these being indicated at 310 in Fig. 3, disposed on the inside of the angle iron tracks 312. In this modification there are a series of such rollers, one every few inches, which bear upwardly against the bottom of ledges or rails cast integrally with the fountain. Except for lifting the rollers very slightly from the tracks, this does not cause any change in operation.

Figure 17:
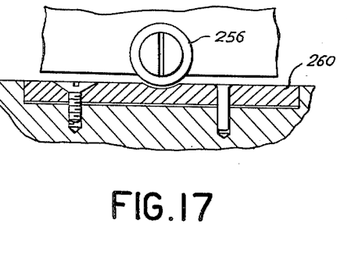
Figs. 17 and 18 are explanatory of a detail of the invention.
Figure 18:
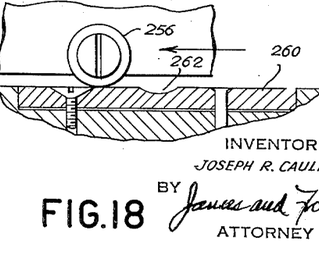

Fig. 16 also shows inserts 260 beneath the wheels 256. The purpose of these may be explained with reference to Figs. 17 and 18. The inserts 260 are located at the wheels 256 when the fountain is in its home or inward position. The inserts are recessed slightly, as indicated at 262, and the inserts are shimmed up by appropriate shims to clear the wheels by only a slight amount, say a few thousandths of an inch. With such a slight clearance, the wheels take the load of the fountain as soon as it is moved axially a very slight amount, following which the fountain is readily moved, because of the anti-friction action of the rollers.

It is not desired to have the fountain rest on the rollers during operation of the press, and the recesses 262 ensure that the rollers are relieved of strain, and that the fountain is seated properly. Referring to Fig. 15, it may be explained that the semi-circular end portions 264 and 266 fit accurately in mating surfaces in the side frames, and it is on these surfaces that the load of the fountain, gravure cylinder, and pressure roller is applied. This is clearly shown in Fig. 9, in which the part 264 rests in frame 50, while part 266 rests in frame 48.

Referring to Figs. 13, 14 and 15, the end portions 270 and 272 act as bearing housings to receive roller bearings for the gravure cylinder. The upper parts 274 and 276 of the bearing housings are preferably made rectangular, as indicated by the flat top surfaces, thus preventing any possibility of rotation of the fountain. Referring to Fig. 9, it will be seen that the journals 278 and 280 of the gravure cylinder are received in roller bearings 282 and 284 respectively, these in turn being locked in position by the split bearing housings previously referred to, and being held against axial movement by appropriate annular keys 285 and 287.

Provision is made for side to side register of the cylinder. For this purpose, the end of journal 278 carries a bearing 286 which in turn is held within a hand wheel 288 having a threaded hub 290 received in an internally threaded ring 292 secured to the outer ring of bearing 282. It will be evident that by rotating the hand wheel 288 relative to the ring 292 the gravure cylinder will be adjusted axially. This adjustment may be locked by a set screw 294.

The opposite end journal 280 (Fig. 9) is keyed at 296 to a sleeve 298 which acts also as the roller bearing previously referred to. The outer end of sleeve 298 is slotted to receive a drive dog 300, connected to a drive shaft 302, carried in a bearing 304. It will be understood that the sleeve 298 is readily moved axially from the dog 300 along with the fountain, when the fountain is rolled out of the press.

To change a gravure cylinder, the motor 174 (Fig. 7) is first operated to raise the pressure roller and its associated guide rollers. The doctor blade and nozzle are tilted back out of the way, as is indicated by the change from the position 20 to the position 20' in Fig. 1, and then raised far enough to clear the aprons 230 and 232 from the fountain. The ink drain pipe 224 (Fig. 9) is lowered by preliminarily releasing the wing screw 228. The outside track structure 254 is added to the press. The clamps 252 are released, and the fountain is pulled outwardly with the aid of the handle 288. The dog and slot drive connection (300 in Fig. 9) at the rear end of the machine separates automatically. After the fountain has been pulled to outside position, the end shields are removed, and the top halves of the bearing housings are removed, whereupon the cylinder may be hoisted upwardly. The roller bearings may be removed for use with another cylinder. If the color of the ink is to be changed, the ink pan or liner is removed and replaced by another. The nozzle may also be replaced. The procedure is then reversed to replace the cylinder.

If the cylinder is of a diameter different from that previously employed, the end shields are changed to conform to the new cylinder diameter. The fountain assembly is slid back into position after replacing the bearing housings. The control handles on the outside of the press may be used to raise or lower the doctor blade holder, and to tilt the doctor blade holder, until the blade wipes the cylinder at a preferred wiping angle and at a preferred location on the cylinder. The position and angle of the nozzle may also be changed, although this is not as critical as that of the doctor blade. The ink drain pipe is reconnected, and the position of the pressure roller with its two guide rollers is readjusted to the new cylinder diameter.

It is believed that the construction and operation, as well as the advantages of my improved enclosed fountain gravure printing press, will be apparent from the foregoing detailed description thereof. The doctor blade may be adjusted to a desired wiping angle on the cylinder regardless of change in diameter of the cylinder. The wiping pressure of the doctor blade is cushioned independently of the resilience of the doctor blade itself. The press unit may be adapted, by changes in the field, to operate for either face printing or back printing, without re-rolling the web, or using a turning bar. The fountain is provided with a changeable ink pan or liner, thus minimizing the need for scrubbing up when there is a change of color. The ink pan is made of relatively non-porous sheet metal, preferably stainless steel, and may be easily cleaned, if desired. The ink fountain is enclosed and sealed effectively, with a minimum of air space around the cylinder. For this purpose, sealing aprons are provided, which act as splash guards, and which also seal the fountain despite changes in the position of the doctor blade and the nozzle. The sealing arrangement is such that the fountain is sealed despite reciprocation of the doctor blade.

The height of the pressure roller may be varied to accommodate a change in cylinder diameter, or preliminarily to removal of the fountain assembly out of the press, without changing the length or tension of the web. The fountain may be moved axially out of the press, even though it is a fully enclosed fountain, and this operation is facilitated by the use of appropriate tracks and rollers with a detachable outside track structure to support the fountain when it is moved out of the press.

It will be apparent that while I have shown and described my invention in a preferred form, changes may be made in the structure disclosed, without departing from the spirit of the invention, as sought to be defined in the following claims. These claims are directed to certain features of my invention. Other features not claimed herein are claimed in my divisional application Serial No. 19,007, filed April 5, 1948.

I claim:

1. An enclosed fountain gravure printing press comprising a fountain, means including rollers on the fountain and stationary tracks at the sides of the fountain to facilitate sliding the fountain axially with the gravure cylinder to a position substantially outside the press, the tracks within the machine being cut away at the position of the rollers when the fountain is in operating position, said cut-away portions receiving inserts recessed at the rollers, and shims in the cut-away portions beneath the inserts, sufficient shims being employed to cause the inserts to clear the rollers by only a very slight amount.

2. A gravure printing press comprising stationary side plates, a removable fountain having bearings at the ends thereof for rotatably receiving a gravure cylinder, the ends of said fountain having large radius semi-cylindrical surfaces concentric with the axis of the printing cylinder, and said side plates having semi-cylindrical supporting surfaces dimensioned to accurately receive the ends of the fountain when the fountain is in place in the machine, at least one side plate having vertical ways above said surface and a top bearing fitting in said ways and secured against the fountain to both lock the fountain in position and to prevent any movement thereof about the axis of the printing cylinder.

3. A gravure printing press comprising stationary side plates, a fountain having bearings at the ends thereof for rotatably receiving a gravure cylinder, means to facilitate sliding the fountain axially with the gravure cylinder through one of the stationary side plates to a position substantially outside the press, the ends of said fountain having large radius semi-cylindrical surfaces concentric with the axis of the printing cylinder, and said side plates having semi-cylindrical supporting surfaces dimensioned to accurately receive the ends of the fountain when the fountain is in place in the machine, one such surface being as large in radius as the fountain, said side plate having vertical ways above said surface and a top bearing fitting in said ways and secured against the fountain to both lock the fountain in position and to prevent any movement thereof about the axis of the printing cylinder.

4. A gravure printing press comprising stationary side plates, a fountain having bearings at the ends thereof for rotatably receiving a gravure cylinder, means including rollers on the fountain and tracks at the sides of the fountain to facilitate sliding the fountain axially with the gravure cylinder through one of the stationary side plates to a position substantially outside the press, the ends of said fountain having large radius semi-cylindrical surfaces concentric with the axis of the printing cylinder, and said side plates having semi-cylindrical supporting surfaces dimensioned to accurately receive the ends of the fountain when the fountain is in place in the machine, the tracks within the machine being cut away at the position of the rollers when the fountain is in operating position, at least one side plate having vertical ways above said surface and a top bearing fitting in said ways and secured against the fountain to both lock the fountain in position and to prevent any movement thereof about the axis of the printing cylinder.

5. A gravure printing press comprising stationary side plates, a fountain having bearings at the ends thereof for rotatably receiving a gravure cylinder, means including rollers on the fountain and tracks at the sides of the fountain to facilitate sliding the fountain axially with the gravure cylinder through one of the stationary side plates to a position substantially outside the press, the ends of said fountain having large radius semi-cylindrical surfaces concentric with the axis of the printing cylinder, and said side plates having semi-cylindrical supporting surfaces dimensioned to accurately receive the ends of the fountain when the fountain is in place in the machine, the tracks within the machine being cut away at the position of the rollers when the fountain is in operating position, said cut away portions receiving appropriately shimmed inserts recessed at the rollers to clear the rollers by only a slight amount when the semi-cylindrical ends rest on the mating surfaces of the side plates, at least one side plate having vertical ways above said surface and a top bearing fitting in said ways and secured against the fountain to both lock the fountain in position and to prevent any movement thereof about the axis of the printing cylinder.

JOSEPH R. CAULFIELD.

REFERENCES CITED

The following references are of record in the file of this patent:

UNITED STATES PATENTS

| Number | Name | Date |
|---|---|---|
| 675,024 | Sonntag | May 28, 1901 |
| 1,782,608 | Fulk | Nov. 25, 1930 |
| 1,896,034 | Weed | Jan. 31, 1933 |
| 2,087,017 | Bulford | July 13, 1937 |
| 2,129,698 | Luehrs | Sept. 13, 1938 |
| 2,138,142 | Dietrich | Nov. 29, 1938 |
| 2,157,587 | Behrens | May 9, 1939 |
| 2,213,130 | Presby | Aug. 27, 1940 |
| 2,293,210 | Marzolf | Aug. 18, 1942 |
| 2,359,770 | Lundbye | Oct. 10, 1944 |
| 2,377,482 | Crafts | June 5, 1945 |
| 2,382,103 | Sandman | Aug. 14, 1945 |

FOREIGN PATENTS

| Number | Country | Date |
|---|---|---|
| 683,910 | Germany | Nov. 18, 1939 |